US011254176B1

(12) United States Patent
Ryshavy et al.

(10) Patent No.: US 11,254,176 B1
(45) Date of Patent: Feb. 22, 2022

(54) ADJUSTABLE BALL JOINT COUPLING

(71) Applicant: Northstar Manufacturing Co., Inc., Minnetonka, MN (US)

(72) Inventors: James R. Ryshavy, West Palm Beach, FL (US); Kurt P. Vinje, Chanhassen, MN (US); Shawn Christopher Miller, Milaca, MN (US)

(73) Assignee: Northstar Manufacturing Co., Inc., Minnetonka, MN (US)

( * ) Notice: Subject to any disclaimer, the term of this patent is extended or adjusted under 35 U.S.C. 154(b) by 0 days.

(21) Appl. No.: 17/222,135

(22) Filed: Apr. 5, 2021

Related U.S. Application Data

(63) Continuation-in-part of application No. 16/540,196, filed on Aug. 14, 2019, now Pat. No. 10,994,580.

(51) Int. Cl.
*B60G 7/00* (2006.01)

(52) U.S. Cl.
CPC ........ *B60G 7/005* (2013.01); *B60G 2204/148* (2013.01); *B60G 2204/416* (2013.01); *B60G 2204/42* (2013.01)

(58) Field of Classification Search
CPC .... B60G 7/005; B60G 7/18; B60G 2204/148; B60G 2204/416; B60G 2204/42; B60G 2204/143; B60G 2200/4622; B60G 2206/50; B62D 17/00
See application file for complete search history.

(56) References Cited

U.S. PATENT DOCUMENTS

| 844,421 | A | | 2/1907 | Stafford |
| 2,977,131 | A | | 3/1961 | Moskovitz et al. |
| 3,104,117 | A | | 9/1963 | Pierce |
| 3,127,192 | A | | 3/1964 | Traugott et al. |
| 3,817,549 | A | | 6/1974 | Bohannon et al. |
| 4,003,666 | A | | 1/1977 | Gaines et al. |
| 4,430,016 | A | | 2/1984 | Matsuoka et al. |
| 4,482,266 | A | | 11/1984 | Kaneko |
| 4,768,895 | A | | 9/1988 | Ludwig |
| 4,776,720 | A | | 10/1988 | Nolen |
| 4,921,271 | A | | 5/1990 | Berry et al. |
| 5,052,711 | A | * | 10/1991 | Pirkey .................... B62D 17/00 280/86.753 |
| 5,080,388 | A | | 1/1992 | Berry et al. |
| 5,931,485 | A | * | 8/1999 | Modinger .............. B60G 7/008 280/86.751 |
| 6,042,294 | A | | 3/2000 | Urbach |
| 6,257,601 | B1 | * | 7/2001 | Spears ................. B60G 13/003 280/124.147 |
| 6,293,724 | B1 | | 9/2001 | Spears et al. |
| 6,409,189 | B1 | | 6/2002 | Orimoto et al. |
| 6,446,991 | B1 | | 9/2002 | Klais |

(Continued)

FOREIGN PATENT DOCUMENTS

EP 1598260 A1 11/2005
KR 19980038710 U * 9/1998
(Continued)

*Primary Examiner* — Jonathan Ng
*Assistant Examiner* — Scott F. Underwood
(74) *Attorney, Agent, or Firm* — Haugen Law Firm PLLP

(57) ABSTRACT

An apparatus is described for interconnecting a steering knuckle and lower suspension arm. The apparatus includes a ball joint assembly having a lateral adjustment feature that allows for increased range of adjustment.

14 Claims, 20 Drawing Sheets

(56) References Cited

U.S. PATENT DOCUMENTS

| | | |
|---|---|---|
| 6,457,728 B1 | 10/2002 | Klais |
| 6,478,318 B1 | 11/2002 | Allman et al. |
| 6,557,872 B1 | 5/2003 | Garrard |
| 6,676,142 B2 | 1/2004 | Allman et al. |
| 6,688,616 B1 | 2/2004 | Ziech |
| 6,783,136 B2 | 8/2004 | Pronsias Timoney et al. |
| 6,851,687 B2 | 2/2005 | Klais |
| 7,111,855 B2 | 9/2006 | Winkler et al. |
| 7,370,868 B2 | 5/2008 | Genick, II |
| 7,513,514 B1 | 4/2009 | Schlosser et al. |
| 7,661,916 B2 | 2/2010 | Downey |
| 7,699,327 B2 | 4/2010 | Halfmann et al. |
| 7,857,332 B2 | 12/2010 | Hsu |
| 7,891,679 B2 | 2/2011 | Svartz et al. |
| 8,042,817 B2 | 10/2011 | Motebennur et al. |
| 8,052,345 B2 | 11/2011 | Byers et al. |
| 8,075,005 B1 * | 12/2011 | Ryshavy ................. B60G 7/02 280/86.756 |
| 8,297,902 B2 | 10/2012 | Schraer |
| 8,469,371 B1 | 6/2013 | Lee et al. |
| 8,544,861 B2 | 10/2013 | Frens |
| 8,746,714 B2 | 6/2014 | Frens |
| 8,757,648 B1 | 6/2014 | Winter |
| 9,233,589 B1 * | 1/2016 | Miller ..................... B60G 7/02 |
| 9,409,598 B2 | 8/2016 | Giorgi et al. |
| 9,476,447 B2 | 10/2016 | Schmidt et al. |
| 9,643,645 B2 | 5/2017 | Dendis et al. |
| 2002/0152867 A1 * | 10/2002 | Meredith ................. B27B 5/29 83/471.3 |
| 2004/0090030 A1 * | 5/2004 | Genick, II ............ F16B 35/041 280/86.753 |
| 2005/0067803 A1 | 3/2005 | Inayoshi et al. |
| 2005/0242539 A1 * | 11/2005 | Matthew ................ B60G 7/008 280/93.511 |
| 2007/0102894 A1 * | 5/2007 | Derisi ...................... B62K 5/08 280/86.751 |
| 2007/0111808 A1 * | 5/2007 | Izquierdo Nunez ...... F16F 9/38 464/160 |
| 2011/0153157 A1 * | 6/2011 | Klank .................... B60G 7/005 701/37 |
| 2013/0183080 A1 * | 7/2013 | Nachbar ............. F16C 11/0638 403/122 |
| 2019/0001773 A1 | 1/2019 | Kwon et al. |
| 2019/0152283 A1 * | 5/2019 | Kwon ................... B29C 43/003 |

FOREIGN PATENT DOCUMENTS

| | | | |
|---|---|---|---|
| KR | 20040000174 A | * | 1/2004 |
| WO | 2005076956 A2 | | 8/2005 |

* cited by examiner

ADJUSTABLE BALL JOINT COUPLING

CROSS-REFERENCE TO RELATED APPLICATIONS

This application claims priority to U.S. patent application Ser. No. 16/540,196 filed on Aug. 14, 2019, the contents of which are being incorporated herein by reference in their entirety.

FEDERAL SPONSORSHIP

Not Applicable

JOINT RESEARCH AGREEMENT

Not Applicable

TECHNICAL FIELD

The present invention relates to an adjustable ball joint, and more particularly to a ball joint capable of adjusting the orientation of the longitudinal axis of the ball joint relative to the vertical axis of the steering knuckle and upper and lower control arms of a vehicle. The adjustable ball joint in accordance with the present invention is further capable of adjusting the lateral position of the ball joint without requiring modifications to the lower control arm.

BACKGROUND

Ball joints have been used in automotive vehicle suspensions to provide rotational pivot joints between two structures within the suspension. By way of example, a ball joint is used to couple the steering knuckle and lower control arm of a vehicle. A typical ball joint includes a concentric shaft and partial sphere formed on the end of the shaft. The end of the shaft opposing the partial sphere is oftentimes threaded and fixed to the steering knuckle. The compact nature and simplification of steering knuckles and control arms of some vehicles has limited the ability to adjust suspension alignment characteristic, such as wheel camber and toe. In some circumstances there may be a desire to adjust wheel camber and toe even in compact or simplistic suspension assemblies. The ball joint assembly coupling of the present invention may allow for adjustment of the camber and toe without requiring modifications to the knuckle or lower control arm.

SUMMARY

Embodiments according to aspects of the invention include an apparatus for adjusting a position of components within a suspension system. The apparatus of the invention is particularly well suited to interconnect the steering knuckle and lower control arm of a vehicle, while providing adjustment between the ball joint and lower control arm. In an embodiment of the invention, the apparatus includes an adjustable ball joint assembly and at least one cam bolt. The adjustable ball joint assembly has a mounting plate to couple the ball joint to the lower control arm. The mounting plate includes bolt receiving slots extending through the mounting plate that allows for attachment to the lower control arm. Spaced apart pillars extend upward from the mounting plate and positioned on opposing ends of at least one of the bolt receiving slots. The cam bolt is positioned or oriented between the spaced apart pillars of the at least one bolt receiving slots. The lower control arm includes apertures that align with the bolt receiving slots and through which an attachment bolt or cam bolt may extend. The ball joint assembly also includes a stud that couples to the steering knuckle The embodiments according to aspects of the invention may additionally include a mounting plate having three bolt receiving slots extending through the mounting plate that allows for 3-point attachment to the lower control arm. The cam bolts include a cam portion and a bolt portion, wherein the cam portion engages with the pillars and the bolt portion extends through the slot. The cam portion may be fixed to or removable from the bolt portion. The stud of the ball joint assembly has a longitudinal axis defining a center axis of the ball joint relative to the knuckle and control arm. When the mounting plate includes three slots, two slots of the three slots are spaced an equal distance from the center axis of the ball joint. The third slot is spaced from the center axis by a distance that is greater than the distance the two slots are spaced from the center axis of the ball joint. In this manner the cam bolt may be turned to laterally move the lower end of the ball joint in and out relative to the center axis of the ball joint. The three slots may be spaced apart and offset laterally from the center axis of the ball joint.

The ball joint assembly may further include a grease fitting coupled to an enclosed end portion of the ball joint. Grease may be forced into a cavity of the ball joint to provide grease to a ball and socket of the ball joint thereby reducing wear of the ball joint. The threaded portion of the stud may include an aperture extending through the stud such that the aperture may receive a cotter pin within the aperture. The cotter pin may be used to restrict turning of the shaft once the threaded portion of the stud is mounted to the knuckle.

A further embodiment according to aspects of the invention includes an apparatus for connecting the steering knuckle and control arm of a vehicle. The apparatus includes a ball joint assembly having a stud that couples to the steering knuckle and a mounting base that couples to the control arm. The mounting base has first, second and third bolt receiving slots extending through the mounting base that are offset from the ball joint. The third bolt receiving slot includes spaced apart pillars extending upwards from the mounting base. The pillars are positioned on opposing ends of the third bolt receiving slot. A cam bolt is oriented between the spaced apart pillars of the third bolt receiving slot. When the cam bolt is turned the bolt portion slides in the slot. The cam bolt extends through an aperture of the control arm, wherein when the cam bolt is turned the mounting plate thereby moves relative to the control arm.

Additionally, the stud may include a longitudinal axis defining a center axis of the ball joint. The first and second slots are spaced an equal distance from the center axis of the ball joint. The third slot is spaced from the center axis by a distance that is greater than the distance the first and second slots are spaced from the center axis of the ball joint. The spacing and orientation of the first, second and third slots align with apertures extending through the lower control arm. In an embodiment of the invention the first, second and third slots are offset and spaced laterally from the center axis of the ball joint. Rotation of the cam bolt causes the attachment bolts and cam bolt to slide in the slots and force the mounting plate in laterally between the control arm and knuckle.

The cam bolt includes a cam portion and a bolt portion. The cam portion may include a cam having an aperture extending through the cam that is offset from the center of the cam. A flat formed on the bolt may engage a flat portion of the aperture whereby when the cam is engaged to the bolt, the cam is fixed relative to the bolt. Alternatively, the cam may be bonded to the bolt or made integral with the bolt. A threaded portion of the stud includes an aperture extending through the stud such that the aperture is adapted for receiving a cotter pin within the aperture.

A further embodiment according to aspects of the invention includes an apparatus for connecting a steering knuckle and control arm of a vehicle. The apparatus includes a ball joint, a cam, and a bolt. The ball joint has a stud that couples to the steering knuckle. The ball joint also has a mounting base that couples to the control arm. The mounting base has at least two elongated bolt receiving slots extending through the mounting base. One of the elongated bolt receiving slots has spaced apart pillars that extend upwards from the mounting base and the pillars are positioned on opposing ends of the corresponding elongated bolt receiving slot. The cam has top and bottom surfaces and a sidewall extending between the top and bottom surfaces. The sidewall has a bottom portion that has a cylindrical shape and a top portion that has a hexagon shape. The cam further has an aperture extending through the cam between the top and bottom surfaces of the cam. The aperture has a center that is not concentric with a center of the cylindrical portion of the cam. Further, the cylindrical portion of the cam is oriented between the spaced apart pillars of the corresponding elongated bolt receiving slot. The bolt extends through the aperture of the cam and is aligned within corresponding the elongated bolt receiving slot that has spaced apart pillars.

Additionally, the aperture of the cam may be counterbored from the top surface of the cam. Further, the cam may include a slot extending into the cam from an outer surface of the top portion of the cam, wherein the slot intersects the aperture of the cam. Also, the at least two elongated bolt receiving slots may comprise three elongated slots. Each elongated slot has a lengthwise axis wherein the lengthwise axis of the three elongated slots are aligned parallel. Also, two of the elongated slots of the three elongated slots may be spaced an equal distance from the center axis of the ball joint. Additionally, the third elongated slot is spaced from the center axis by a distance that is greater than the distance the two elongated slots are spaced from the center axis of the ball joint. Also, the three elongated slots may be spaced laterally from the center axis of the ball joint.

In use, the mounting plate is bolted to the lower control arm and the stud of the ball joint couples to the knuckle. In an alternative embodiment the mounting plate is mounted to a mount of the steering knuckle and the stud of the ball joint couples to the control arm. A nut is turned onto the stud and a cotter pin or other fastener is used to retain the nut on the stud. The cam bolt may be turned to move the lower portion of the ball joint laterally or in and out relative to the position of the lower control arm and knuckle. Further, in some embodiments an open face wrench may be used to hold the hexagon portion of the cam while the cam bolt is tightened or the cam may be turned while the cam bolt is held in place with a wrench. Additionally, a second cam bolt and pillars may be positioned on the mounting plate to further adjust the angular orientation of the mounting plate relative to the control arm and knuckle. In this manner, the alignment of the wheel may be adjusted in multiple axis or a single axis. By adjusting the alignment of the wheel relative to the lower control arm and knuckle the tread life of the wheel may be enhanced.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
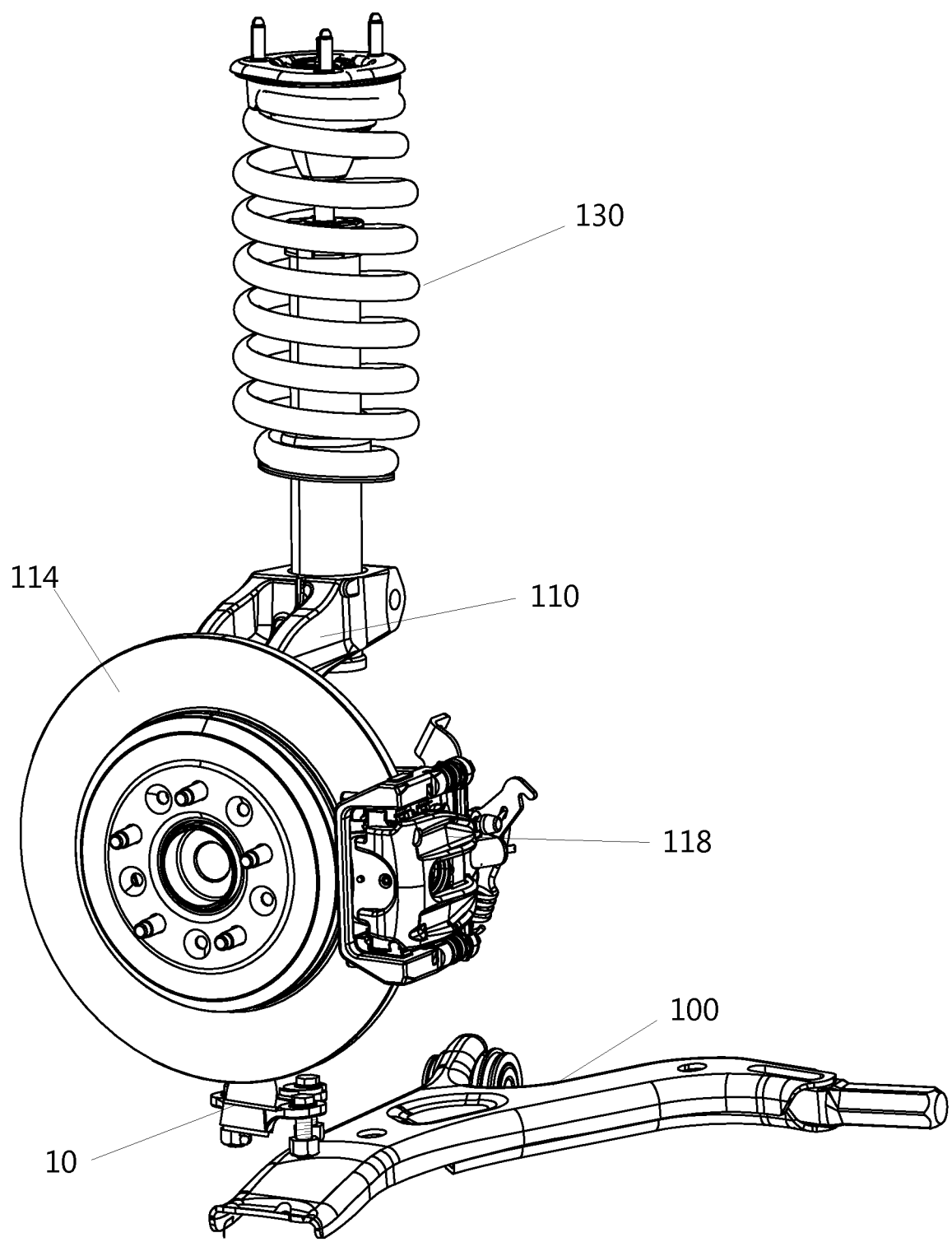
FIG. 1 is a partial exploded front right perspective view of an adjustable ball joint coupling in accordance with an embodiment of the invention shown oriented in a portion of a front end suspension and steering assembly of a vehicle.
Figure 2:
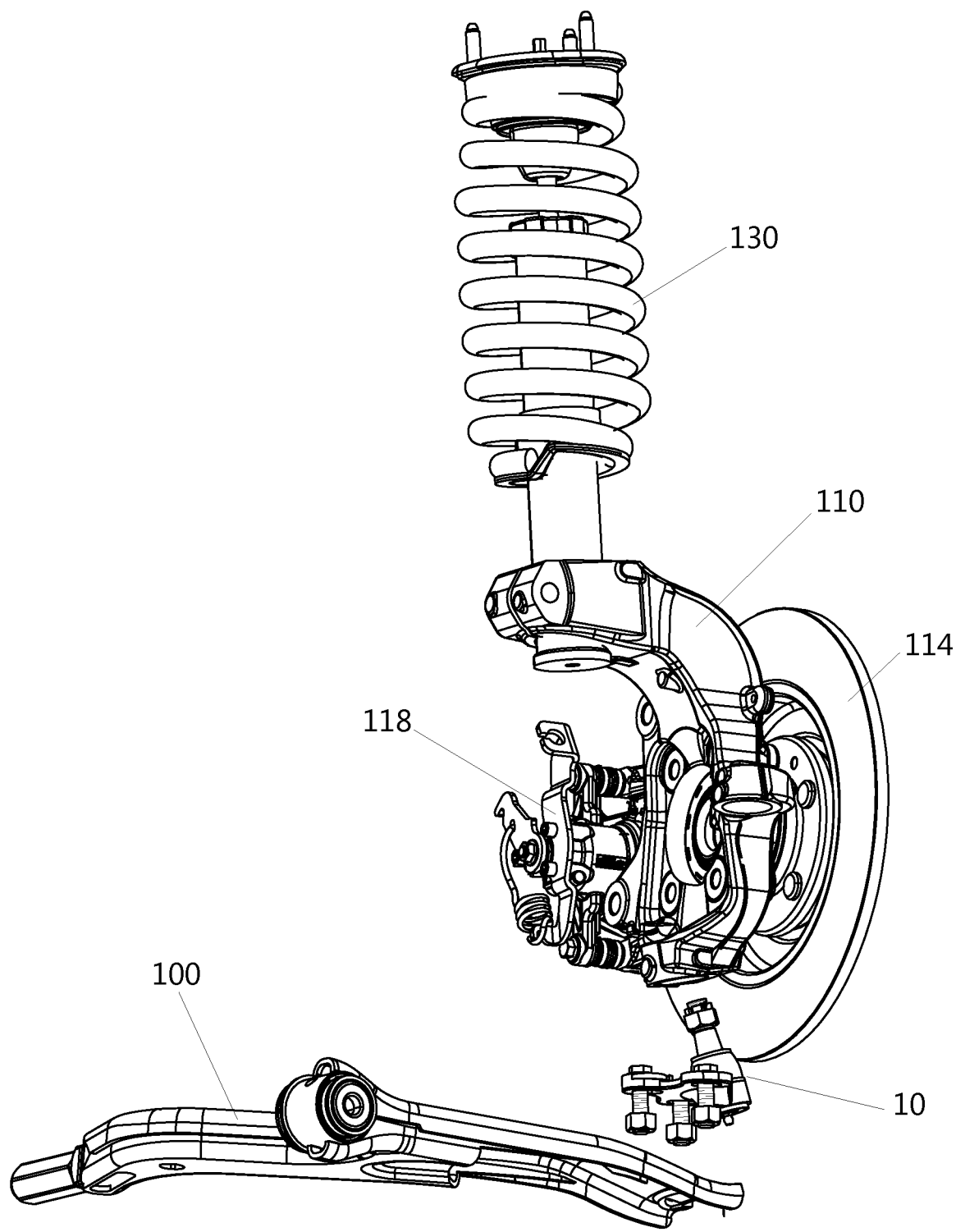
FIG. 2 is a partial exploded back left perspective view of an adjustable ball joint coupling in accordance with an embodiment of the invention shown oriented in a portion of a front end suspension and steering assembly of a vehicle.
Figure 3:
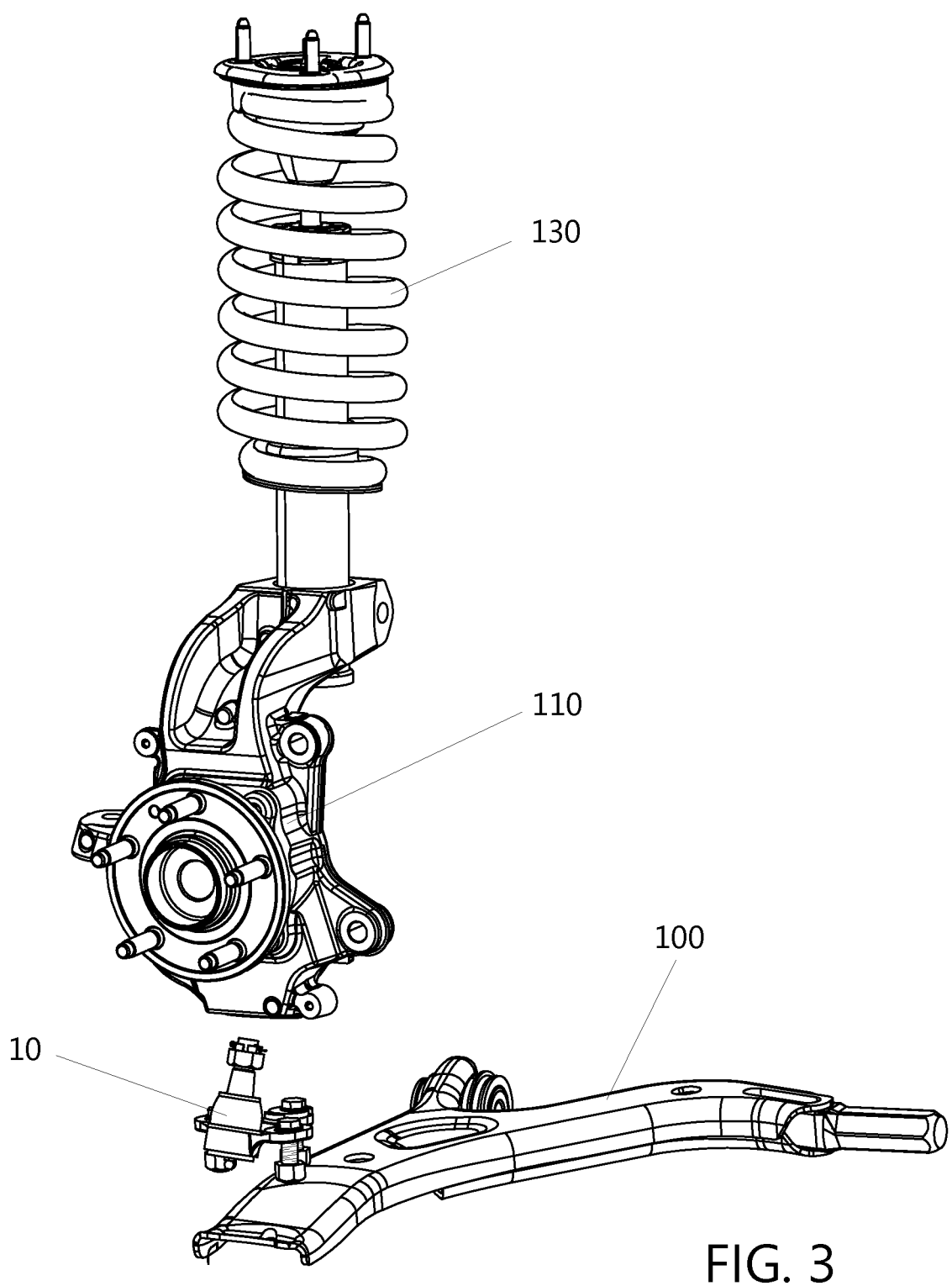
FIG. 3 is a partial exploded front right perspective view of an adjustable ball joint coupling in accordance with an embodiment of the invention shown oriented in a portion of a front end assembly of the type shown in FIG. 1 with the rotor and brakes removed.
Figure 4:
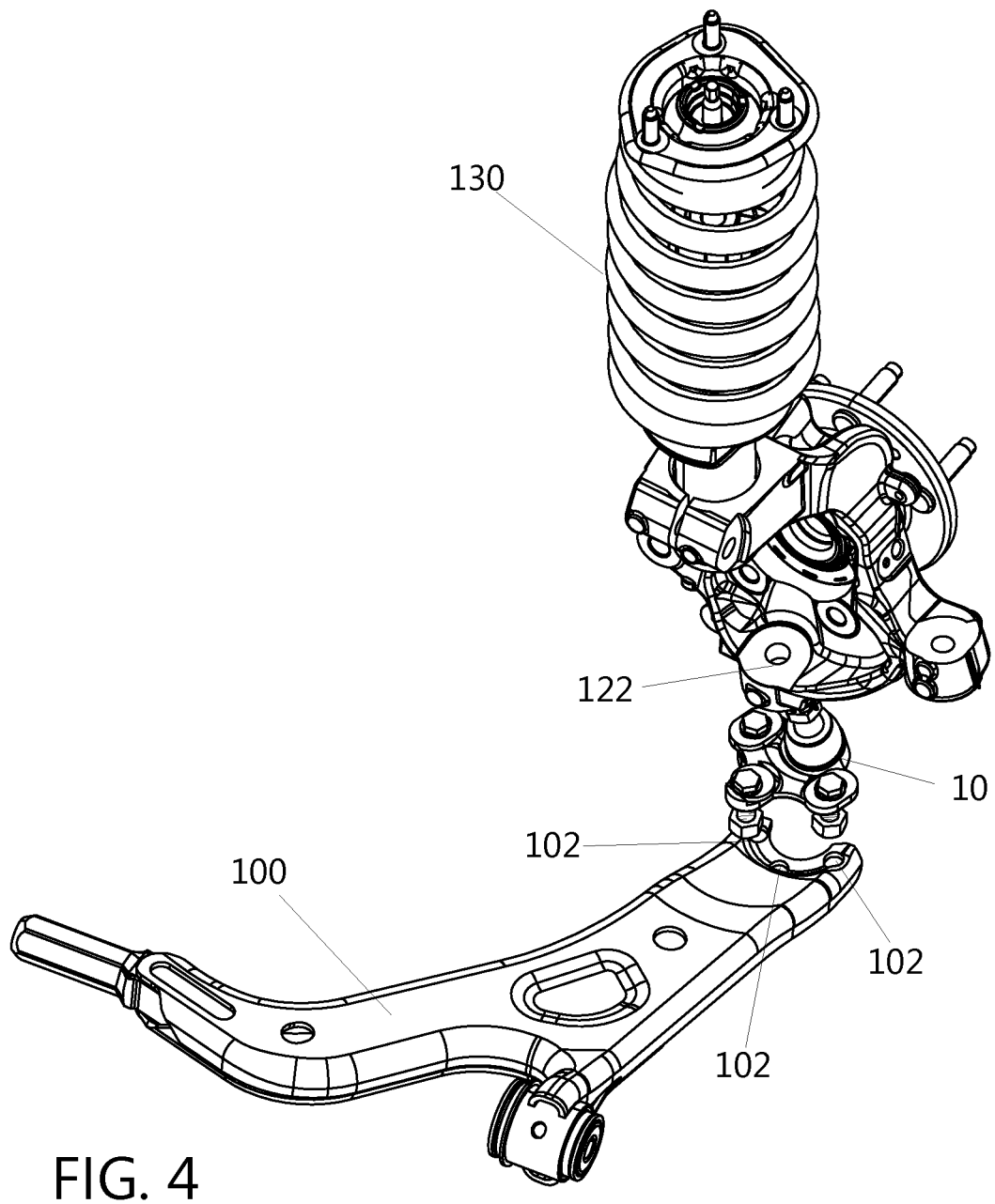
FIG. 4 is a partial exploded back left perspective view of an adjustable ball joint coupling in accordance with an embodiment of the invention shown oriented in a portion of a front end assembly of the type shown in FIG. 2 with the rotor and brakes removed.
Figure 5:
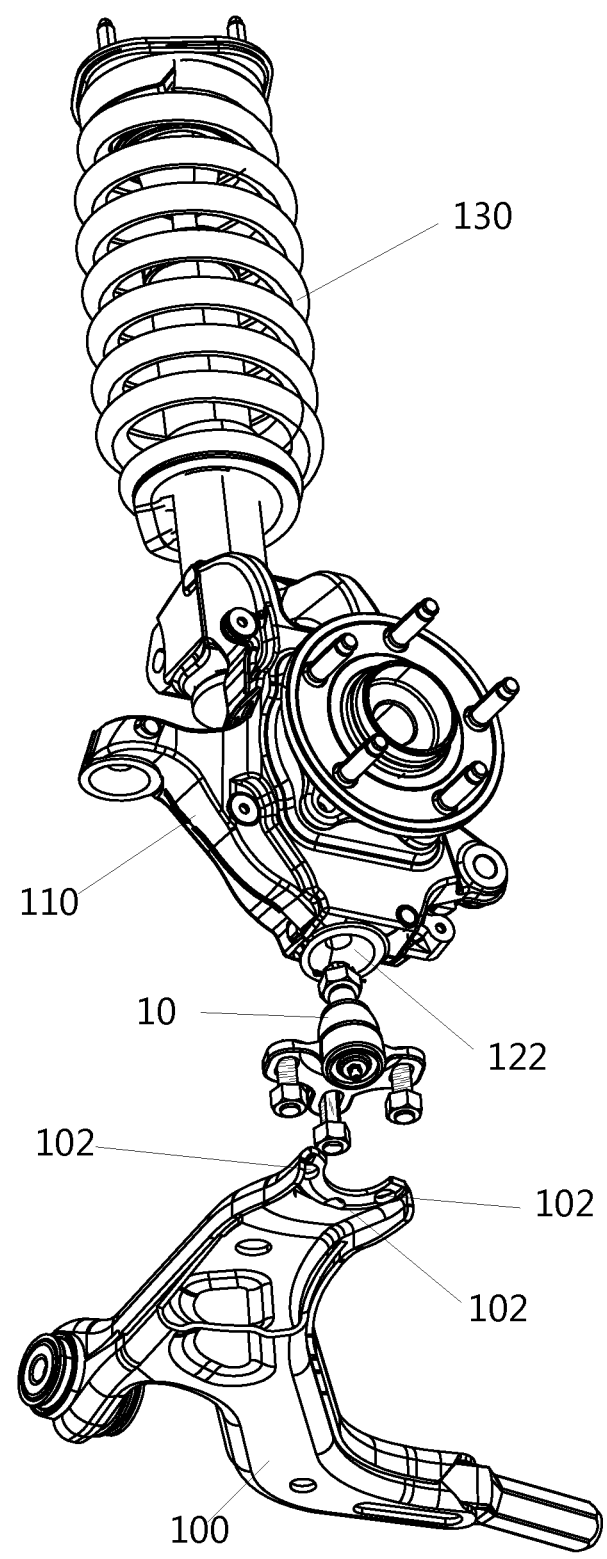
FIG. 5 is a partial exploded bottom front left perspective view of an adjustable ball joint coupling in accordance with an embodiment of the invention shown oriented in a portion of a front end assembly of the type shown in FIG. 1 with the rotor and brakes removed.
Figure 6:
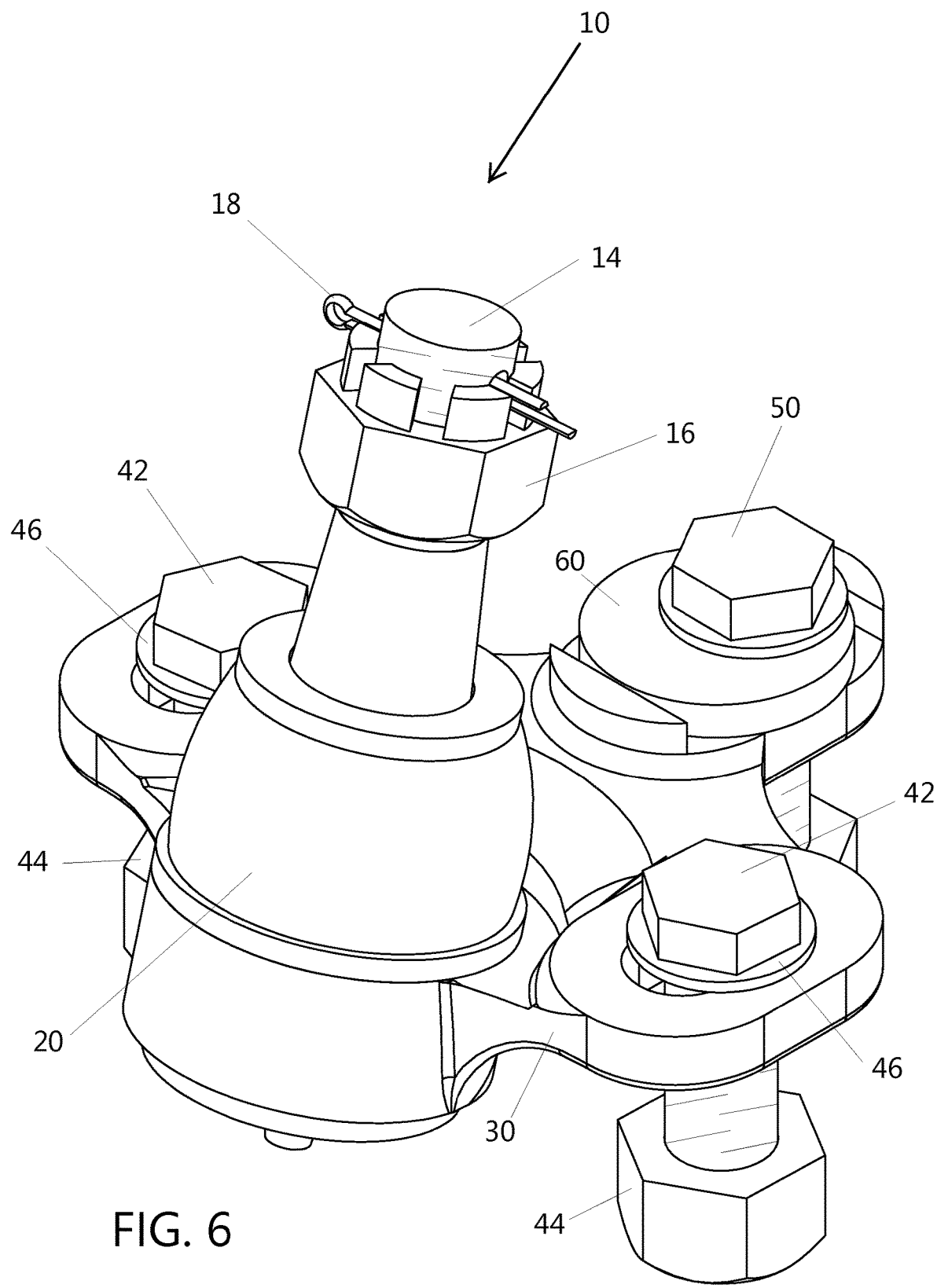
FIG. 6 is an upper front right perspective view of an adjustable ball joint coupling in accordance with an embodiment of the invention.
Figure 7:
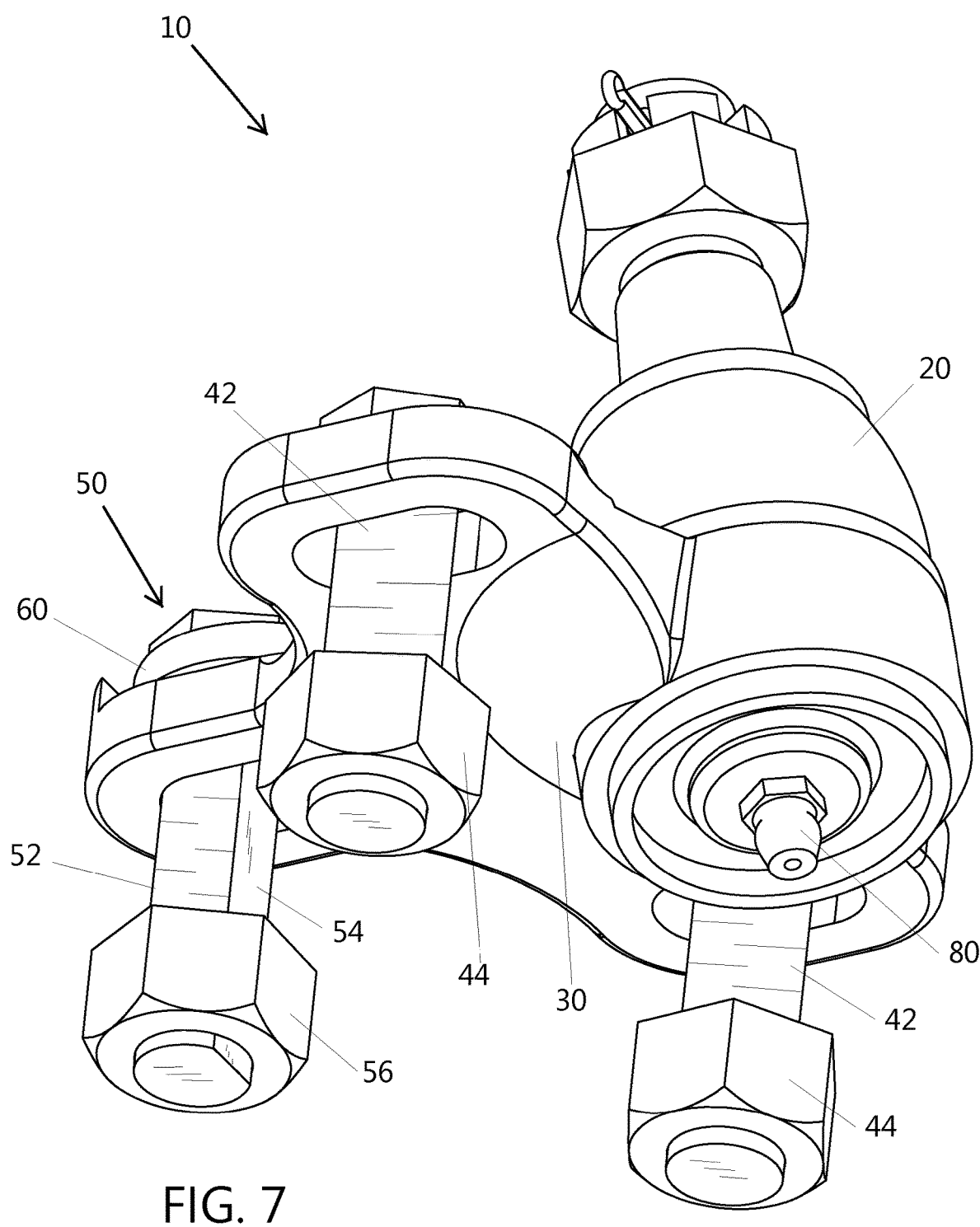
FIG. 7 is a lower front left perspective view of an adjustable ball joint coupling in accordance with an embodiment of the invention.
Figure 8:
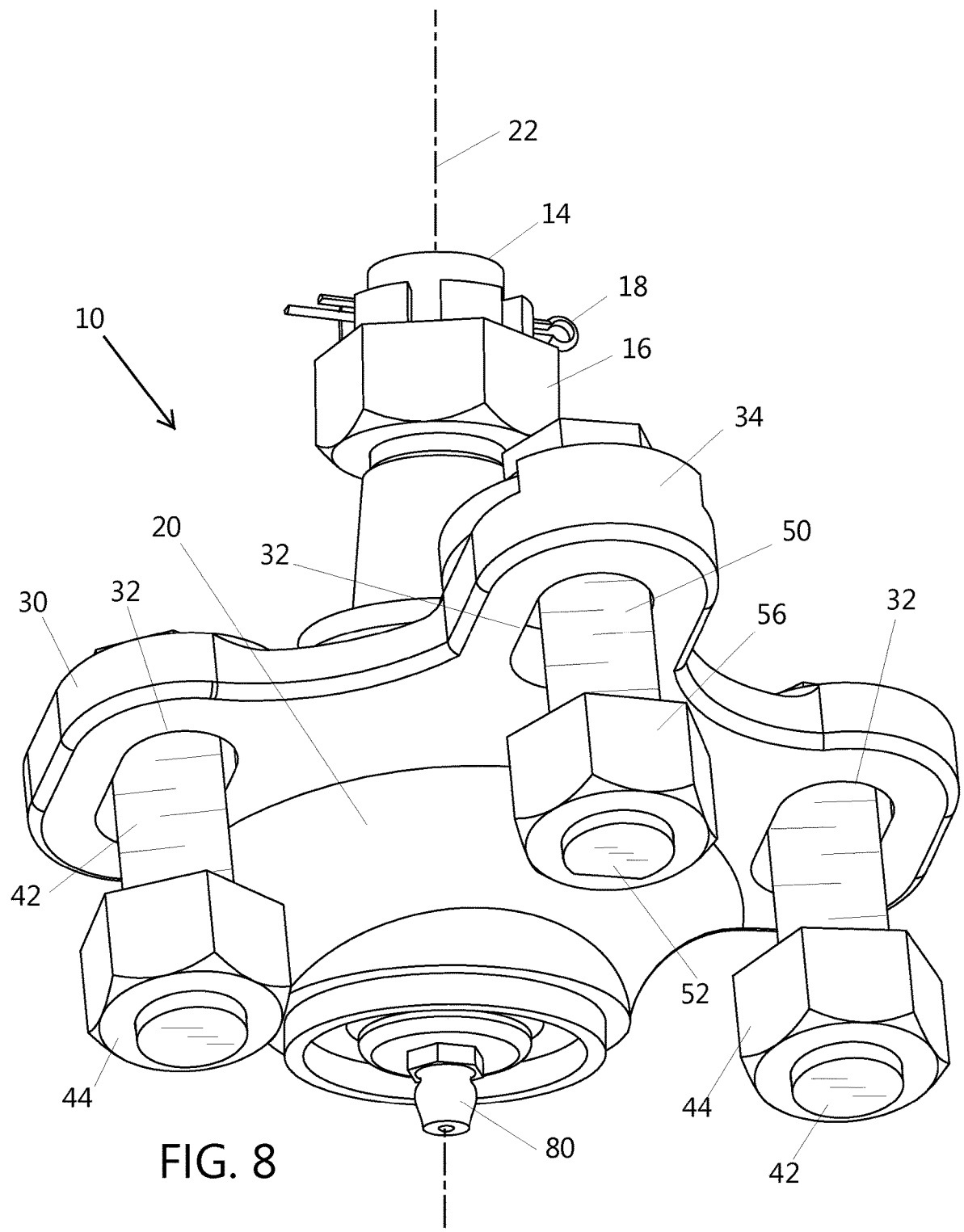
FIG. 8 is a lower back perspective view of an adjustable ball joint coupling in accordance with an embodiment of the invention.
Figure 9:
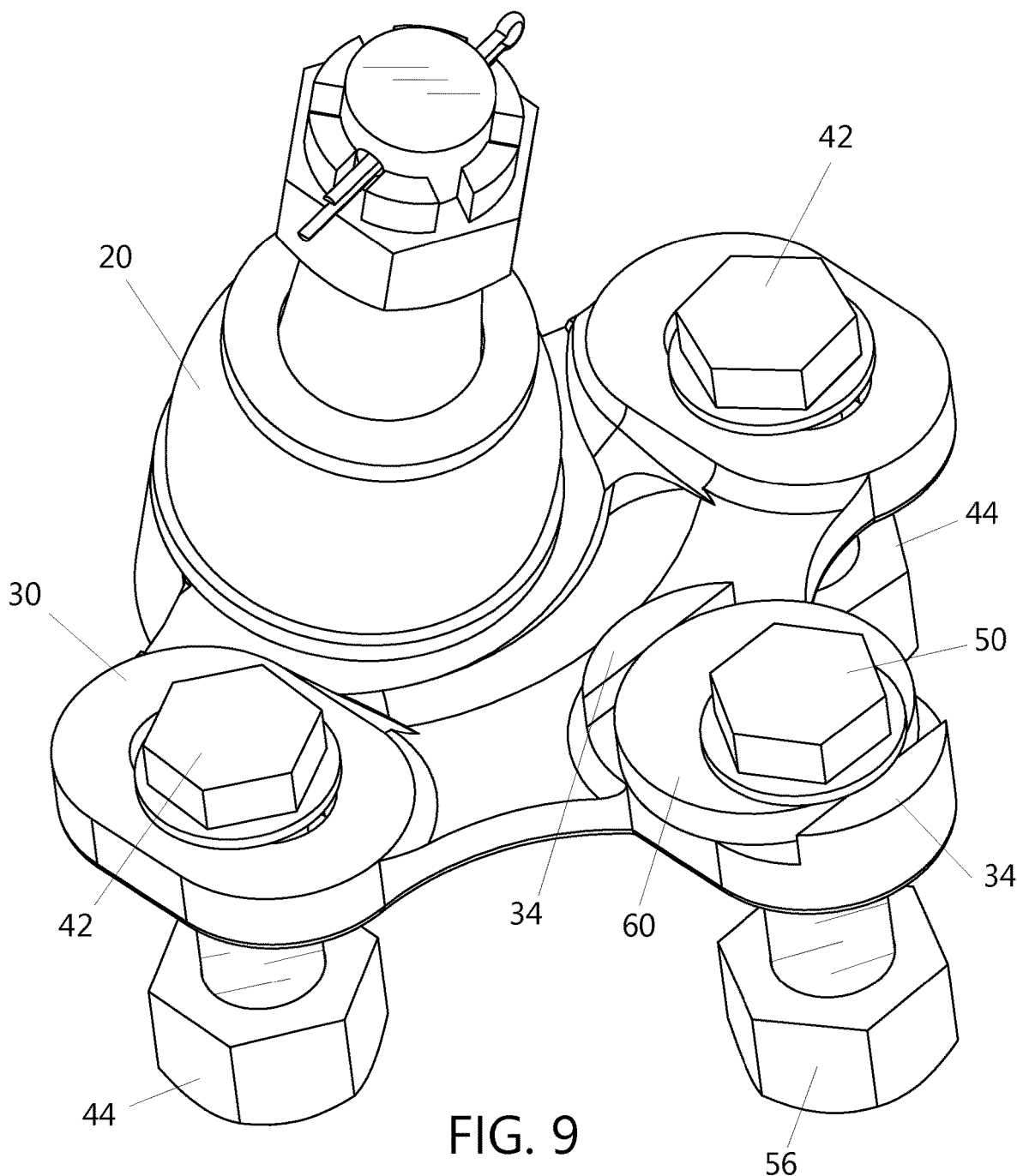
FIG. 9 is an upper back perspective view of an adjustable ball joint coupling in accordance with an embodiment of the invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The ball joint assembly 10 of the present invention generally includes a ball joint stud 14, socket 20, retention nut 16, mounting base or plate 30, and cam bolt assembly 50. FIGS. 1-5 illustrates a ball joint assembly 10 aligned for coupling to the bottom portion 122 of a steering knuckle 110 and a top portion of a lower control arm 100. The steering knuckle 110 is shown in some of the views having a rotor 114 and brake assembly 118 coupled to the steering knuckle 110.

The ball joint coupling 10 of the present invention is particularly well suited to interconnect the steering knuckle 110, upper suspension 130, and lower control arm 100 of a vehicle, while providing adjustment between the ball joint 10 and lower control arm 100. Bolts 42 and cam bolt 50 extend through apertures 102 of the control arm 100 to thereby mount the ball joint coupling 10 to the lower control arm 100. The bolts may include washers 46 to allow free rotation of each of the bolts within the slots 32. Nuts 44 may be utilized to fasten the bolts to the mounting plate 30 and lower control arm 100 and fix the position of the ball joint coupling 10 relative to the lower control arm 100.

Rotation of cam bolt 50 moves the ball joint coupling 10 in a controlled manner to adjust the position of the ball joint coupling relative to the control arm 100 and steering knuckle 110. The ball joint assembly 10 may further include a grease fitting 80 coupled to an enclosed end portion or socket 20 of the ball joint. Grease may be forced into the socket or cavity 20 of the ball joint to provide grease to a ball (not shown) formed on the end of stud 14 thereby reducing wear of the ball joint. The threaded portion of the stud 14 may include an aperture extending through the stud 14 such that the aperture may receive a cotter pin 18 within the aperture. The cotter pin may be used to restrict turning of a nut 16 on the stud shaft once the threaded portion of the stud 14 is mounted to the knuckle 110.

With reference to FIGS. 6-9 the adjustable ball joint assembly has a mounting plate 30 to couple the ball joint 10 to the lower control arm 100. The mounting plate 30 includes bolt receiving slots 32 extending through the mounting plate that allows for attachment to the lower control arm 100. The ball joint assembly 10 also includes stud 14 that couples to the lower mount 122 of the steering knuckle 110. Retention nut 16 engages stud 14 and retains the stud 14 within the lower mount 122 of the knuckle 110. Cotter pin 18 restricts the nut 16 from turning loose from the stud 14. The mounting plate 30 further includes spaced apart pillars 34 extending upward from the mounting plate 30. The spaced apart pillars 34 are positioned on opposing ends of at least one of the bolt receiving slots 32. The cam bolt 50 is positioned or oriented between the spaced apart pillars 34 of the at least one bolt receiving slots 32.

Figure 10:
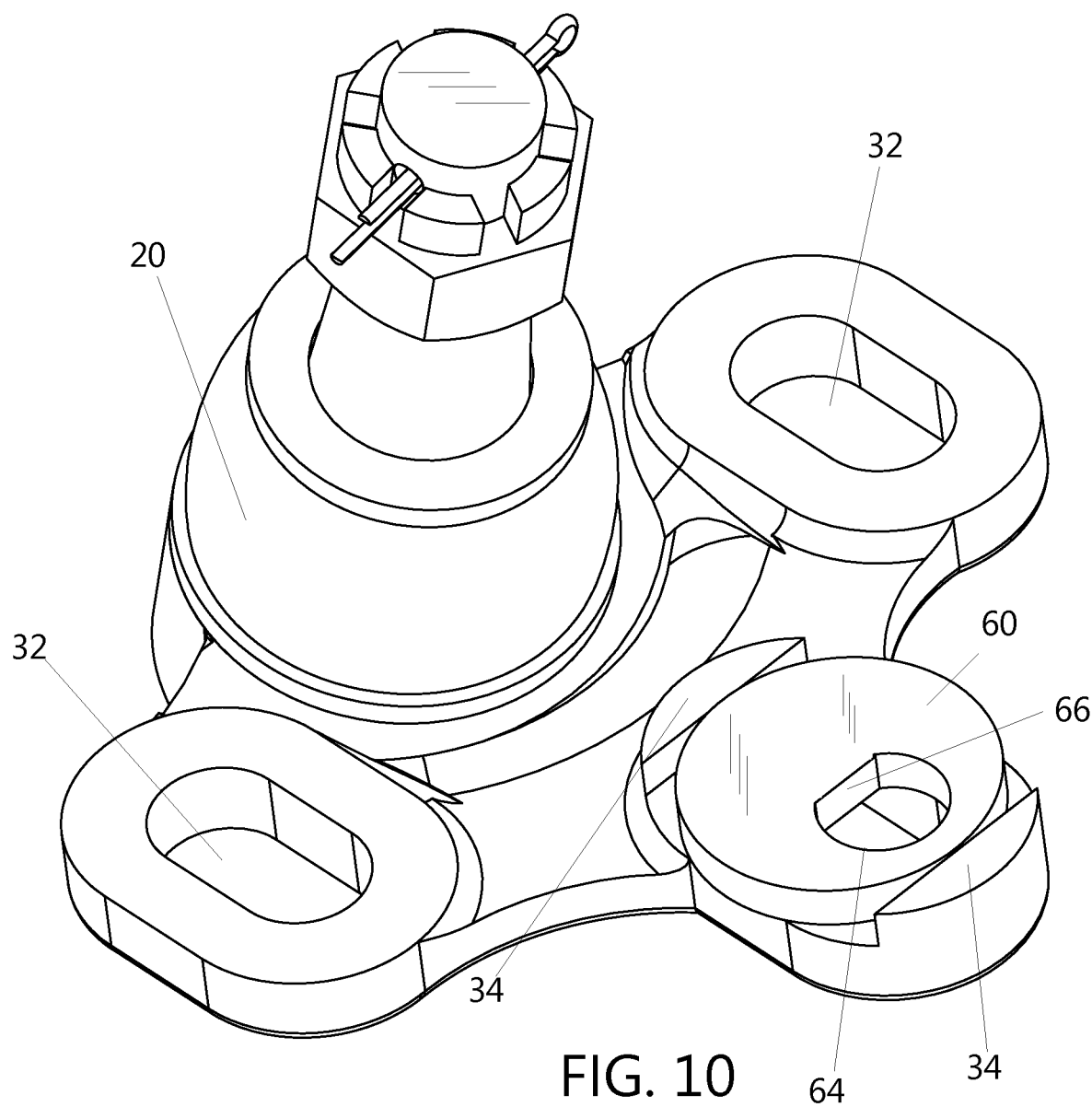
FIG. 10 is an upper back perspective view of an adjustable ball joint coupling in accordance with an embodiment of the invention having the coupling nuts and bolts removed.
Figure 14:
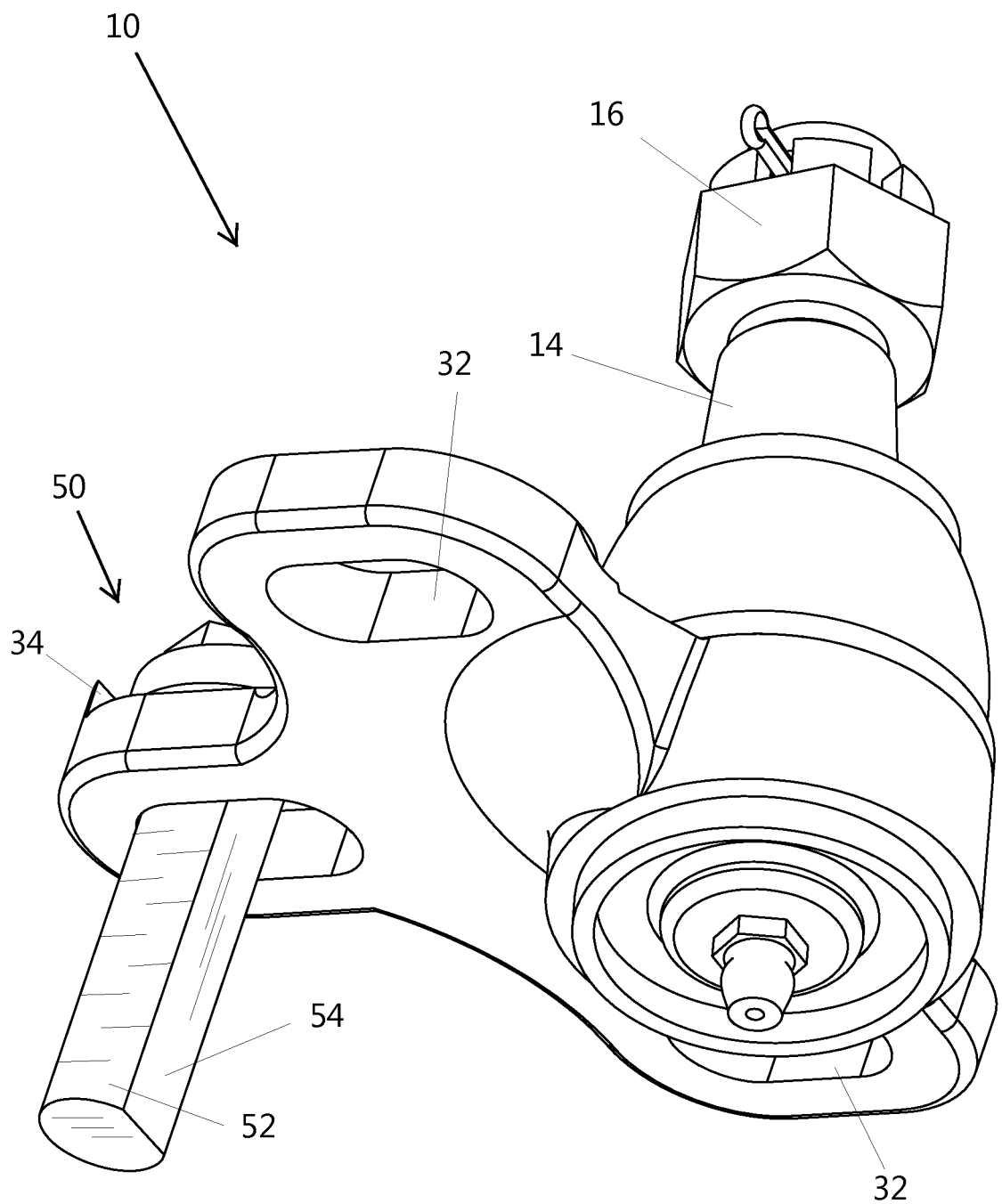
FIG. 14 is a lower left front perspective view of an adjustable ball joint coupling in accordance with an embodiment of the invention having the coupling bolts and nut of the cam bolt removed.
Figure 15:
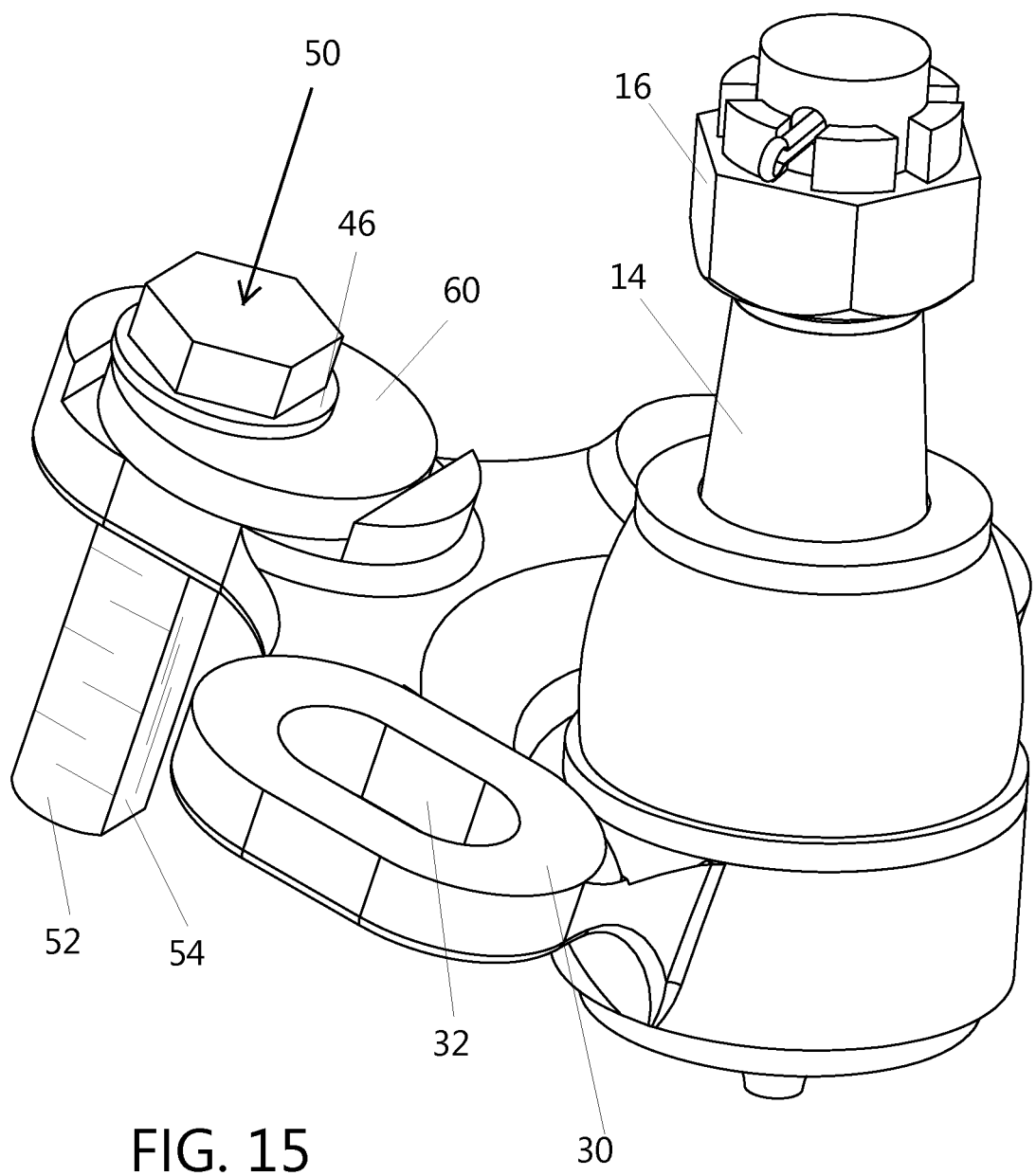
FIG. 15 is an upper left side perspective view of an adjustable ball joint coupling in accordance with an embodiment of the invention having the coupling bolts and nut of the cam bolt removed.

The cam bolt 50 includes a cam portion 60, bolt portion 52 and nut 56. The cam portion 60 may be fixed to or removable from the bolt portion 52. The bolt portion 52 may include a flat 54 formed on a shoulder of the bolt 52 or formed on a lengthwise portion of the bolt 52. The cam portion 60 includes an aperture 64 extending through the cam that is offset from the center of the cam. Within the aperture is a flat portion 66 that aligns and mates with the flat 54 formed on the bolt portion 52 (see, for example, FIG. 10 and FIGS. 14-15). In this manner the cam is keyed to the bolt portion in a manner to restrict the cam from rotation about the bolt portion 52. When the bolt 50 is turned, the cam 60 rotates between pillars 34 and the bolt slides within slot 32. In this manner the position of the center of the bolt 50 may be adjusted within the slot 32.

Figure 11:
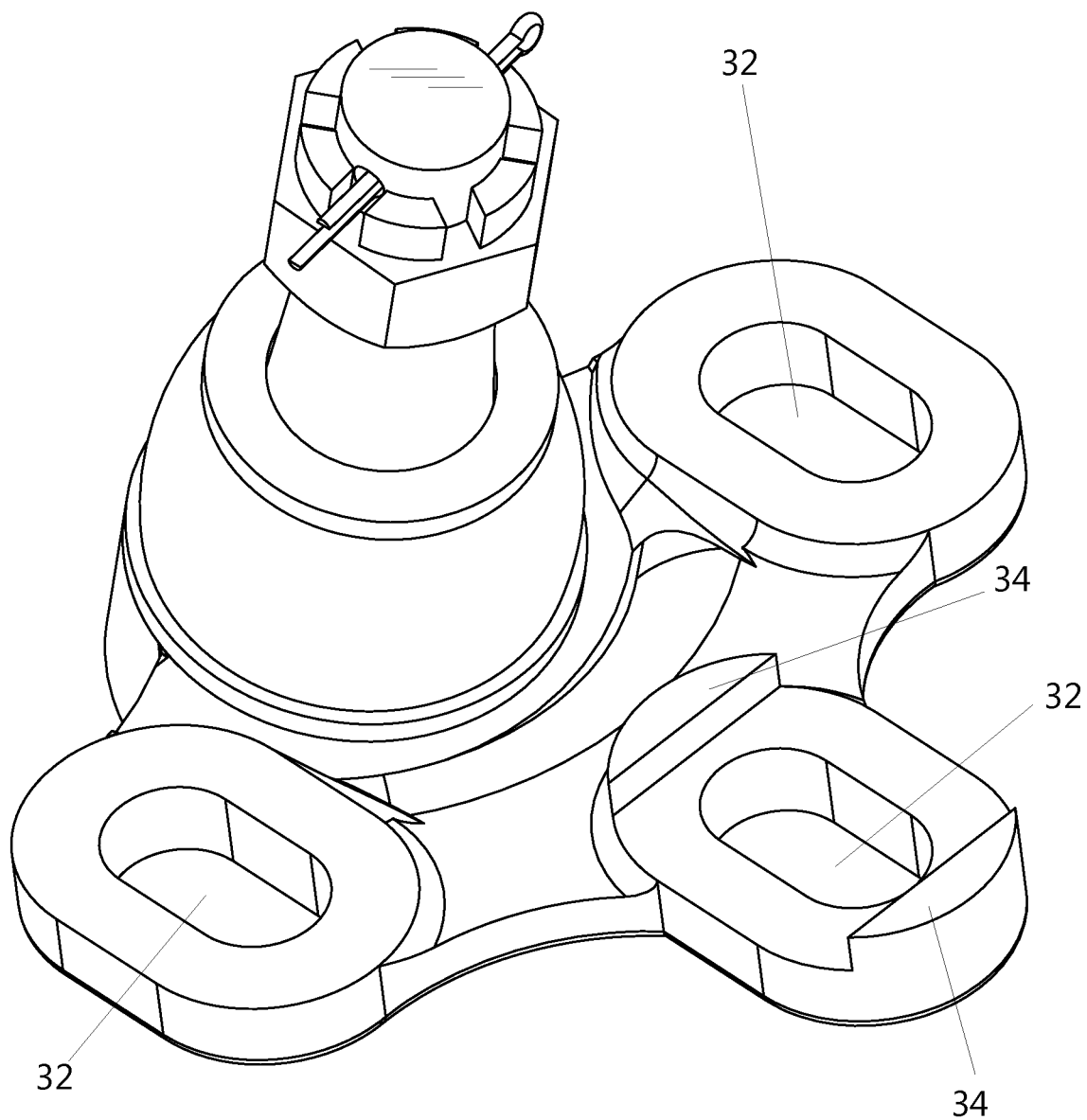
FIG. 11 is an upper back perspective view of an adjustable ball joint coupling in accordance with an embodiment of the invention having the coupling bolts and cam bolt removed.
Figure 12:
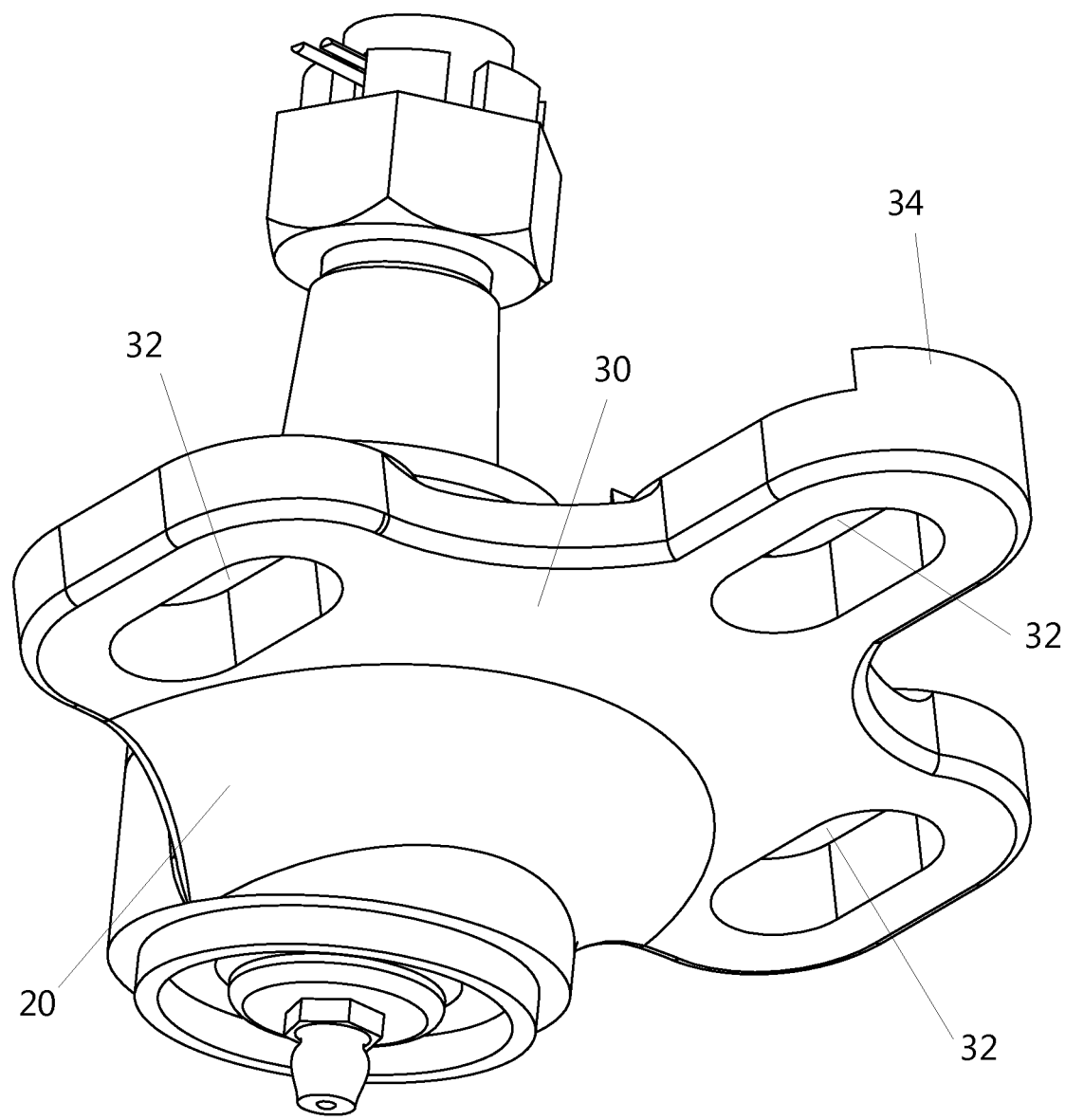
FIG. 12 is a lower back right perspective view of an adjustable ball joint coupling in accordance with an embodiment of the invention having the coupling bolts and cam bolt removed.

Further, the mounting plate 30 has three bolt receiving slots 32 extending through the mounting plate 30 that allows for 3-point attachment to the lower control arm 100 (see, for example, FIGS. 11-12). When the ball joint coupling is aligned with the apertures 102 of the lower control arm, the cam bolt portion 52 engages with the pillars 34 and the bolt portion 52 extends through a corresponding slot 32. The stud 14 of the ball joint assembly 10 has a longitudinal axis 22 (see FIG. 8) defining a center axis of the ball joint 10 relative to the knuckle 110 and control arm 100. The position of the bolts 42 and cam bolt 50 are fixed relative to apertures 102. Thus, when the bolt 52 of the cam bolt 50 is turned, the mounting plate 30 is forced to slide relative to the bolts.

Figure 13:
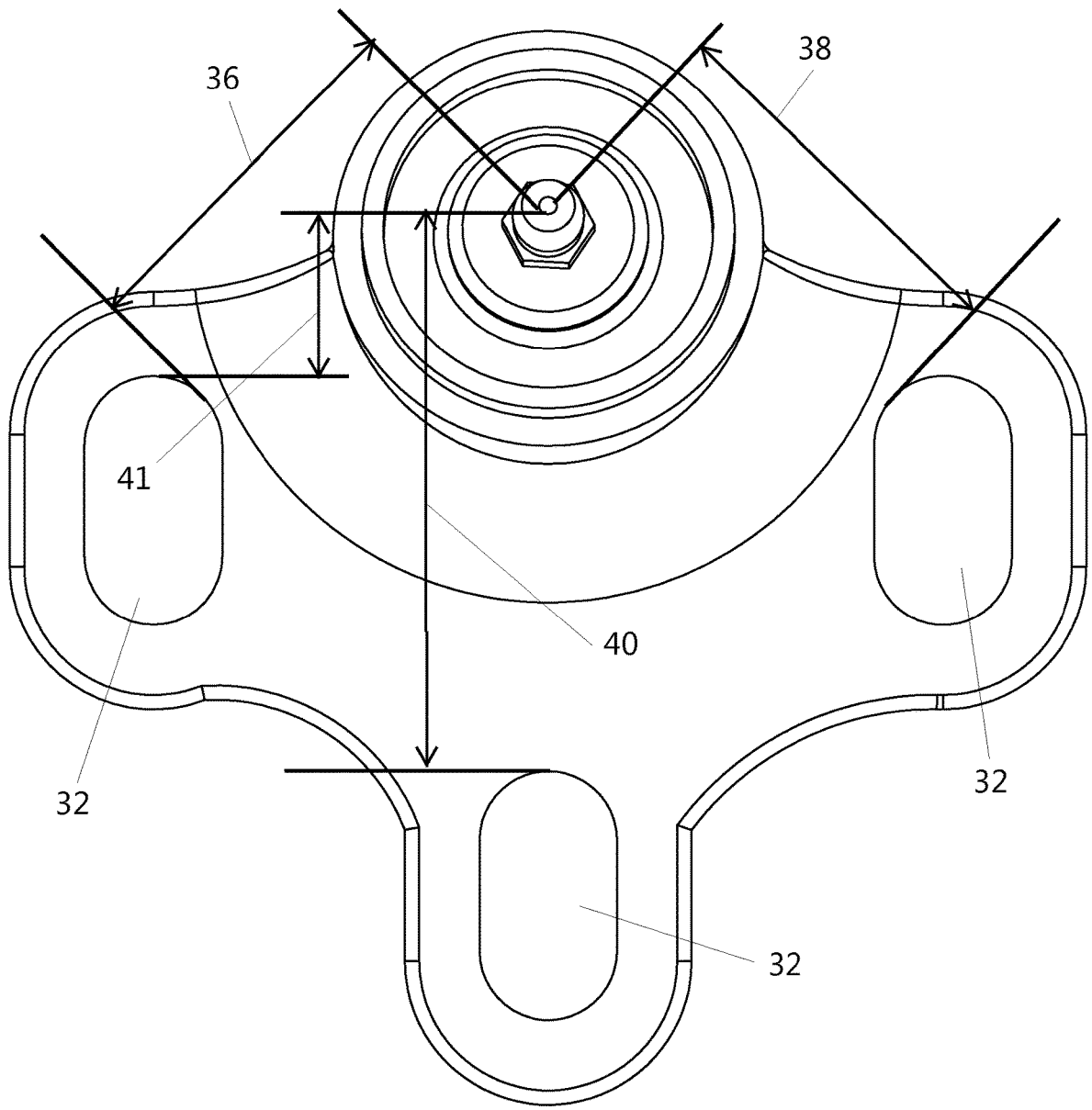
FIG. 13 is a top elevational view of an adjustable ball joint coupling in accordance with an embodiment of the invention having the coupling bolts and cam bolt removed.

When the mounting plate 30 includes three slots 32, two slots of the three slots are spaced an equal distance 36 and 38 from the center axis of the ball joint (see FIG. 13). The third slot is spaced from the center axis by a distance 40 that is greater than the distance 36 and 38 of the two slots from the center axis of the ball joint. Further, the two slots of the three slots is offset a distance 41 from the center axis 22 of the ball joint. In this manner the cam bolt 50 may be turned to laterally move the lower end of the ball joint in and out relative to the center axis 22 of the ball joint when the bolts 42 are fixed in apertures 102 of the control arm 100. Also, the three slots 32 may be spaced apart and offset laterally from the center axis of the ball joint 22 dependent upon the lower control arm 100 configuration and placement of the apertures 102 extending through the control arm.

Figure 16:
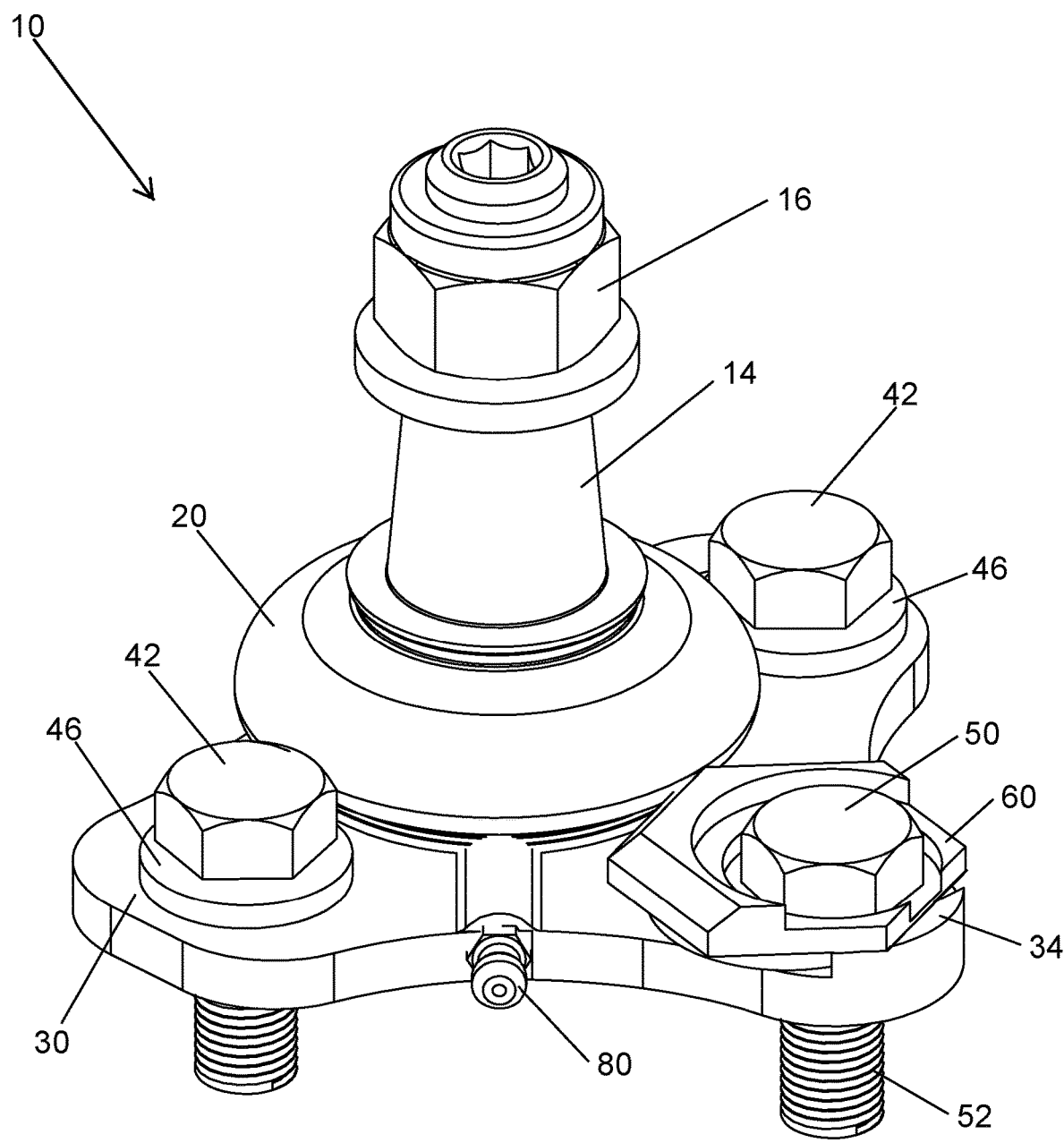
FIG. 16 is an upper perspective view an adjustable ball joint coupling in accordance with an embodiment of the invention.
Figure 17:
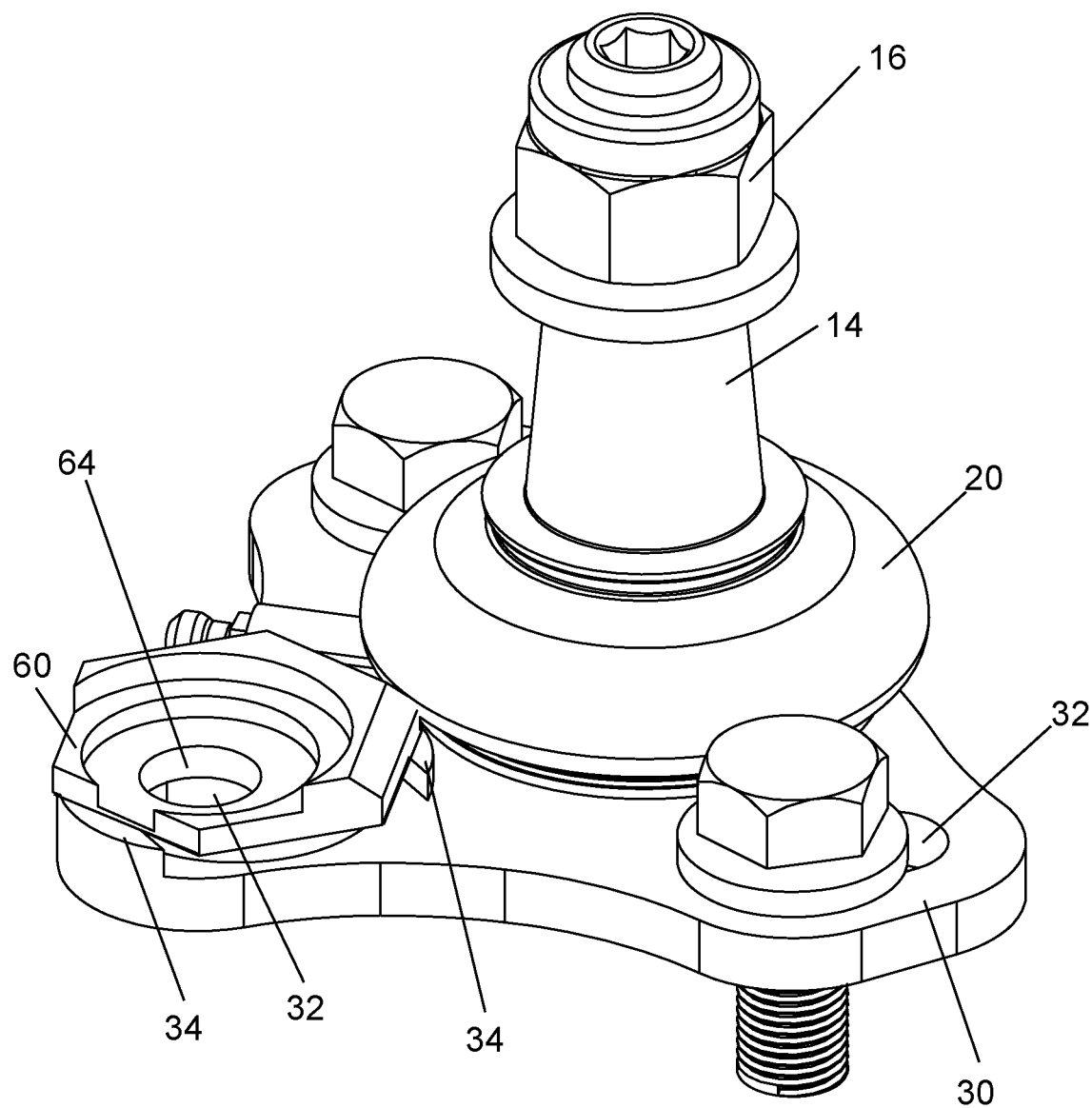
FIG. 17 is an upper perspective view an adjustable ball joint coupling in accordance with an embodiment of the invention.

With reference to FIGS. 16-20, an alternative adjustable ball joint coupling 10, in accordance with the present invention, is illustrated. As seen in FIGS. 16-17, similar to other embodiments of the invention illustrated in FIGS.

6-15, the adjustable ball joint assembly 10 has a mounting plate 30. The mounting plate 30 includes bolt receiving slots 32 extending through the mounting plate that allows for attachment to the knuckle or alternatively to the lower control arm. Bots 42 and washers 46 may be aligned with bolt receiving slots 32 and used to secure the mounting plate to the knuckle or control arm. The ball joint assembly 10 also includes stud 14 extending from socket 20 of the mounting plate 30. Retention nut 16 engages stud 14 and retains the stud 14 to the control arm or alternatively to the knuckle. The mounting plate 30 further includes spaced apart pillars 34 extending upward from the mounting plate 30. The spaced apart pillars 34 are positioned on opposing ends of at least one of the bolt receiving slots 32. The cam bolt 50 is positioned or oriented between the spaced apart pillars 34 of the at least one bolt receiving slots 32.

Figure 18:
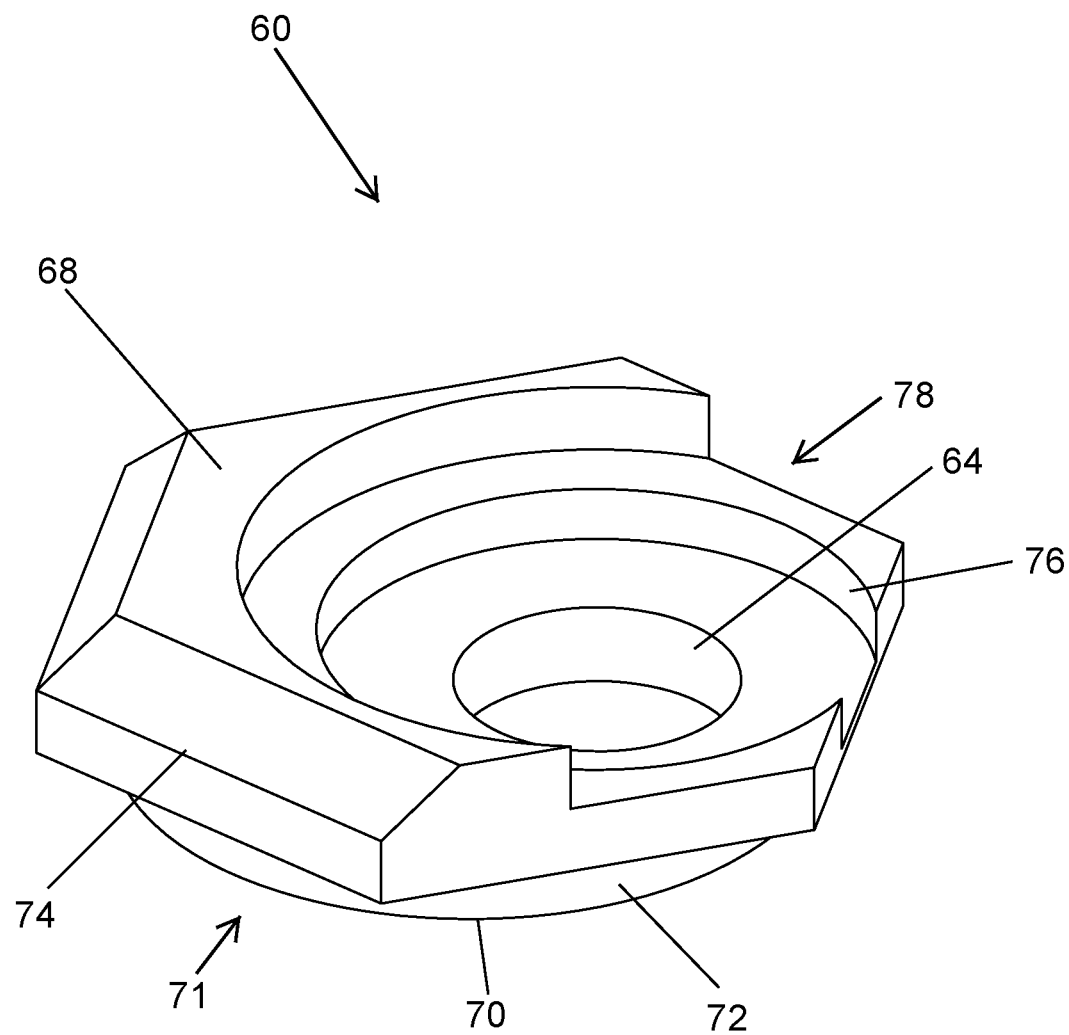
FIG. 18 is an upper perspective view a cam of a cam bolt in accordance with an embodiment of the invention.
Figure 19:
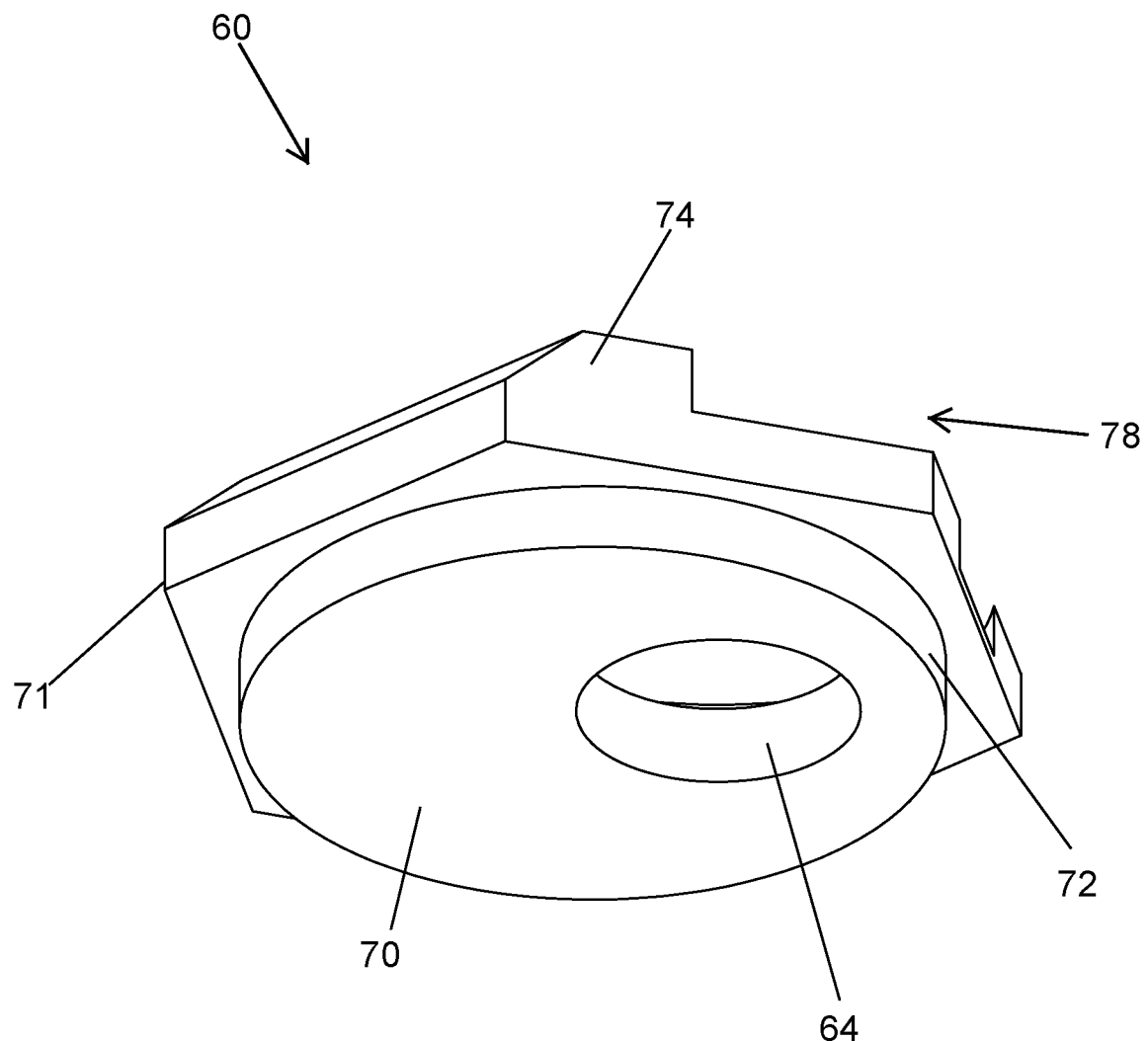
FIG. 19 is an upper perspective view a cam of a cam bolt in accordance with an embodiment of the invention.

Cam 60 is aligned with the bolt receiving slot having pillars 34. With reference to FIGS. 18-19 the cam includes a top surface 68 and bottom surfaces 70. Sidewall 71 extends between the top and bottom surfaces 68 and 70. The sidewall 71 has a bottom portion having a cylindrical shape 72 and a top portion having a hexagon shape 74. The cam 60 further has an offset aperture 64 extending through the cam 60 between the top and bottom surfaces 68 and 70 of the cam. The aperture 64 has a center that is not concentric with a center of the cylindrical portion 72 of the cam. Further, the cylindrical portion 72 of the cam 60 is oriented between the spaced apart pillars 34 of the corresponding elongated bolt receiving slot 32.

Figure 20:
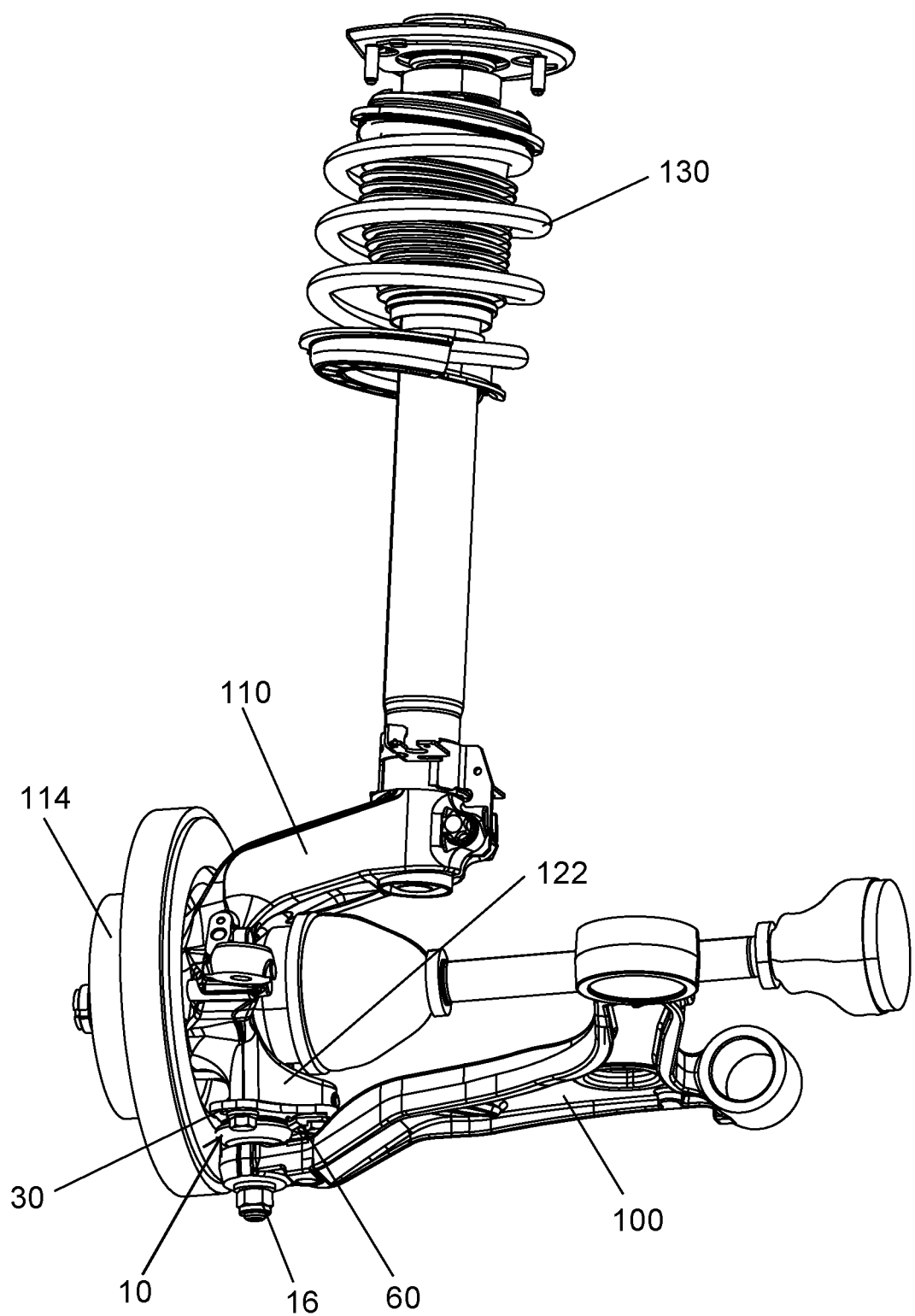
FIG. 20 is a partial exploded perspective view of an adjustable ball joint coupling in accordance with an embodiment of the invention shown oriented in a portion of a front end suspension and steering assembly of a vehicle

The aperture 64 of the cam 60 includes counterbore 76 which is counterbored from the top surface 68 of the cam. The counterbore has a diameter sufficient for the head cam bolt 50 to reside. The cam also includes a slot 78 extending into the cam from the sidewall outer surface of the top hexagon portion 74 of the cam. The slot 78 extends into the cam and intersects the aperture 64 of the cam. The slot is sized to allow a wrench head to insert into the slot and engage the head of the bolt. With reference to FIG. 20, this particular embodiment of the ball joint coupling 10 of the present invention is particularly well suited for applications where very little space between the knuckle and control arm is provided. As seen from the figure there is insufficient space for socket wrenches however open face or ratcheting wrenches may be used to engage the head of bolt 50 and the hexagon shape of the cam 60. An open face wrench may be used to turn cam 60 so that the rotor is aligned at a desired orientation. Then the wrench is used to hold the cam in place while another open face wrench is used to tighten bolt 50. In this manner, an adjustable ball joint may be provided even when very minimal distance is provided between the knuckle and control arm.

In use of certain other embodiments described above, the stud 14 is mounted to steering knuckle 110 and held in place with nut 16. Likewise, bolts 42 and cam bolt are positioned extending through slots 32 of the mounting plate and through apertures 102 of the lower control arm. Nuts 44 and 56 retain the bolts 42 and cam bolt 50 respectively with respect to the ball joint coupling 10 and lower control arm 100. When the user desires to modify the alignment of the ball joint coupling 10 relative to the lower control arm, nuts 44 and 56 may be loosened a sufficient amount to allow rotation of cam bolt 50. A rotation of the bolt portion 52 of the cam bolt 50, moves the ball joint coupling in a controlled manner relative to the lower control arm 100, thereby effectively changing the position of the rotor 114 coupled to the steering knuckle 110. Those skilled in the art will appreciate that the mounting plate 30 may be modified to include multiple pairs of pillars to allow for multiple cam bolts and controlled sliding of the ball joint coupling 10 in multiple axis.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An adjustable ball joint for coupling a steering knuckle to a control arm of a vehicle suspension, the adjustable ball joint comprising:
    a shaft extending along a shaft axis, and including a first end having a ball portion with a partial spherical surface, and a second end adapted for coupling to one of the steering knuckle and the control arm;
    a mounting plate having a plurality of elongated parallel slots extending therethrough, the slots each having a width and a length that is greater than the width, and a slot axis extending along the length;
    a socket for pivotally receiving the ball portion therein, the socket being connected to the mounting plate;
    a cam guide extending at least partially around a perimeter of at least one of the elongated slots;
    a plurality of bolts each adapted to extend through a respective one of the elongated slots along a respective bolt axis for securing the mounting plate to another of the steering knuckle and control arm; and
    a cam coordinating with a respective one of the bolts and the cam guide, wherein rotation of the respective bolt about the bolt axis correspondingly rotates the cam in contact with the cam guide to move the mounting plate with respect to the plurality of bolts along the slot axis.

2. The adjustable ball joint of claim 1 wherein the second end is adapted for coupling within an aperture in the steering knuckle.

3. The adjustable ball joint as in claim 2 wherein the second end has a threaded region.

4. The adjustable ball joint as in claim 1 wherein the mounting plate includes three elongated slots having parallel slot axes.

5. The adjustable ball joint as in claim 4, including a cam guide extending at least partially around each of the parallel elongated slots.

6. The adjustable ball joint as in claim 1 wherein the cam guide includes spaced apart pillars extending from the mounting plate.

7. The adjustable ball joint as in claim 1 wherein the bolt axis is perpendicular to the slot axis.

8. The adjustable ball joint wherein claim 1 wherein the cam is integrated with the bolt.

9. An adjustable ball joint for coupling a steering knuckle to a control arm of a vehicle suspension, the adjustable ball joint comprising:

a shaft extending along a shaft axis, and including a first end having a ball portion with a partial spherical surface, and a second end adapted for coupling to one of the steering knuckle and the control arm;

a mounting plate having a plurality of elongated parallel slots extending therethrough, the slots each having a width and a length that is greater than the width and a slot axis extending along the length;

a socket for pivotally receiving the ball portion therein, the socket being connected to the mounting plate;

a cam guide extending at least partially around a perimeter of at least one of the elongated slots;

a plurality of bolts each adapted to extend through a respective one of the elongated slots along a respective bolt axis for securing the mounting plate to another of the steering knuckle and control arm; and a cam for coordinating with a respective one of the bolts and the cam guide, the cam having a base portion with a cylindrical wall extending circumaxially about a base axis, and a polyhedron engagement portion connected to the base portion, the polyhedron engagement portion defining a polyhedral perimeter wall formed about an engagement axis that is parallel to and spaced from the base axis, and a bolt aperture extending through the cam along the engagement axis for receiving the respective bolt therethrough, wherein rotation of the cam about the engagement axis in contact with the cam guide correspondingly moves the mounting plate with respect to the plurality of bolts along the slot axis.

10. The adjustable ball joint as in claim 9, including three of the elongated slots.

11. The adjustable ball joint as in claim 10 wherein two of the three elongated slots are equally spaced from the shaft axis by a first distance.

12. The adjustable ball joint as in claim 11 wherein the third elongated slot is spaced from the shaft axis by a second distance that is greater than the first distance.

13. A cam member for use with a bolt, the cam member comprising a base portion with a cylindrical wall extending circumaxially about a base axis, a polyhedron engagement portion connected to the base portion, the polyhedron engagement portion defining a polyhedral perimeter wall formed about an engagement axis that is parallel to and spaced from the base axis, and a bolt aperture extending through the cam along the engagement axis for receiving the bolt therethrough, the polyhedron engagement portion including a top surface and a counterbore in the top surface and coaxial with the engagement axis, the polyhedral wall having a first circumaxial portion with a first axial dimension and a second circumaxial portion with a second axial dimension that is less than the first axial dimension.

14. The cam member as in claim 13 wherein the second circumaxial portion extends circumaxially about the engagement axis to an extent at least as great as the first circumaxial portion.

* * * * *